July 22, 1952 R. ANXIONNAZ ET AL 2,604,277
JET PROPULSION AND BOUNDARY LAYER CONTROL SYSTEM FOR AIRCRAFT
Filed Feb. 27, 1946 5 Sheets-Sheet 3

INVENTOR
René Anxionnaz,
M. H. L. Sédille & R. J. Imbert
By Watson, Cole, Grindle & Watson July 22, 1952  R. ANXIONNAZ ET AL  2,604,277
JET PROPULSION AND BOUNDARY LAYER CONTROL SYSTEM FOR AIRCRAFT
Filed Feb. 27, 1946  5 Sheets-Sheet 4
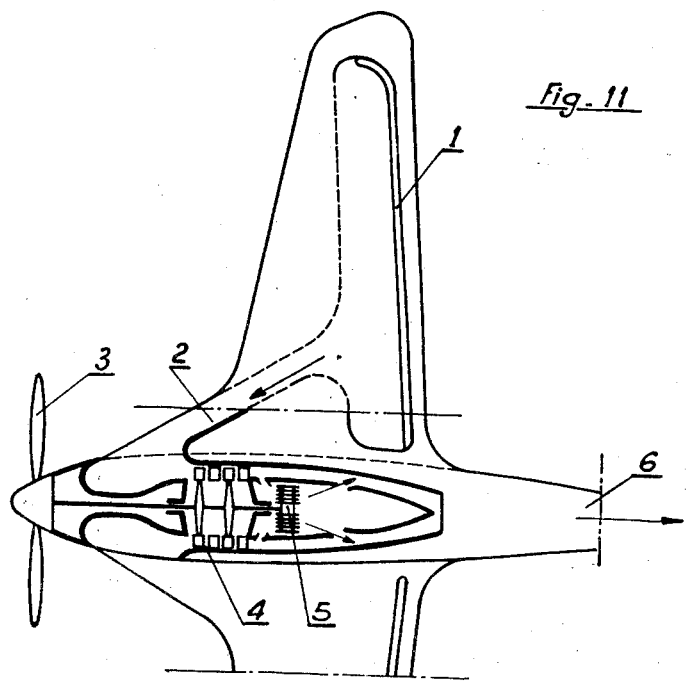
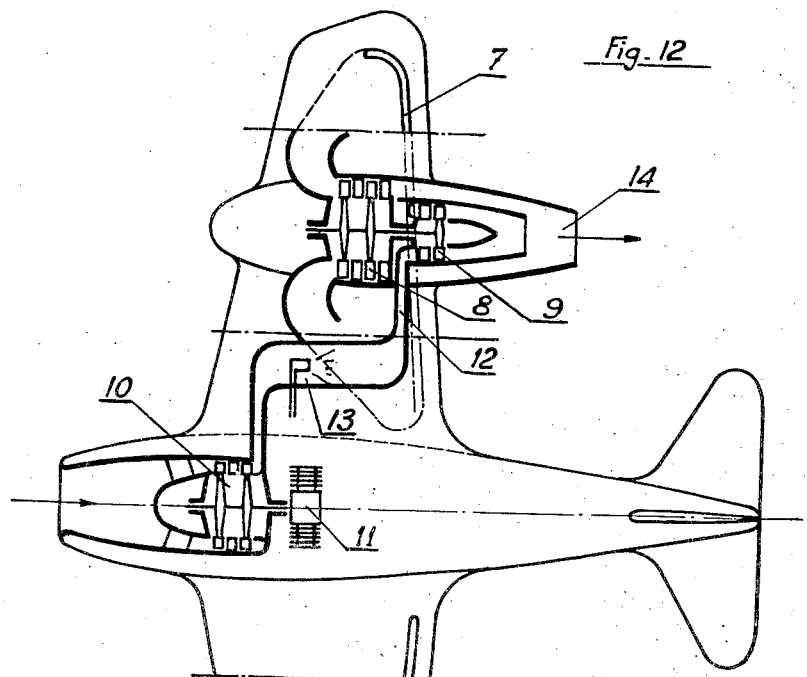

Patented July 22, 1952

2,604,277

UNITED STATES PATENT OFFICE 2,604,277

JET PROPULSION AND BOUNDARY LAYER CONTROL SYSTEM FOR AIRCRAFT

René Anxionnaz, Marcel Henri Louis Sédille, and Roger Jean Imbert, Paris, France, assignors, by direct and mesne assignments, of one-half to Societe Rateau (Societe Anonyme), Paris, France, a company of France Application February 27, 1946, Serial No. 650,564
In France March 31, 1945

3 Claims. (Cl. 244—15)

It is a well known fact that the resistance to progression in aircraft is in direct relationship with the distribution of the speeds in the air stream lines forming the limiting layer over the surface of the outer walls of the apparatus particularly of the wings and fuselage walls. As a matter of fact, there is produced over each of these surfaces and in immediate proximity therewith a slowing down of the air particles through the action of friction and of viscosity leading finally to losses of energy. The existence of friction produces therefore the drag of a certain amount of air in the direction of progress of the aircraft. The air would remain stationary as soon as the aircraft has passed through it, if air were a perfect fluid. In practice and by reason of the action of friction, a certain mass of air moves in the same direction as the aircraft.

On the other hand it is known that the aircraft may be propelled by means of reaction jet propellers or of an association of such reaction jet propellers with air-screws, which produces the progression of the aircraft by making use of the reaction of a certain mass of air or fluid ejected rearwards. These engines remove a certain mass of air, from the front of the aircraft and eject it to the rear with a relative speed which is higher than the speed of progress of the aircraft. Consequently after the aircraft has passed, said mass of air moves with reference to the atmosphere with a certain absolute speed, the direction of which is opposed to the progress of the aircraft. The absolute kinetic energy of these two masses of air constitutes a loss which it is preferable to avoid.

The present invention consists chiefly in sucking at least part of the limiting layer, slowed down in the vicinity of the walls and feeding at least partly the reaction jet propeller or propellers with the air at reduced speed thus removed from said limiting layer. It will be seen hereinafter that similar arrangements may be advantageously applied to auxiliary means such as air-intakes for the driving apparatus, radiators, high-lift means and aerodynamic brakes.

The following description and accompanying drawings given by way of example and by no means in a limitative sense will show how the invention may be executed.

Figure 7A:
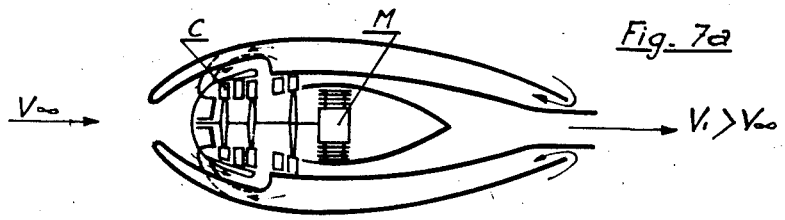
Figs. 7a, 7b, 7c are similar views of reaction jet propellers with a partial suction of the limiting layer and a supplementary admission of air at the front end of the aircraft.
Figure 8:
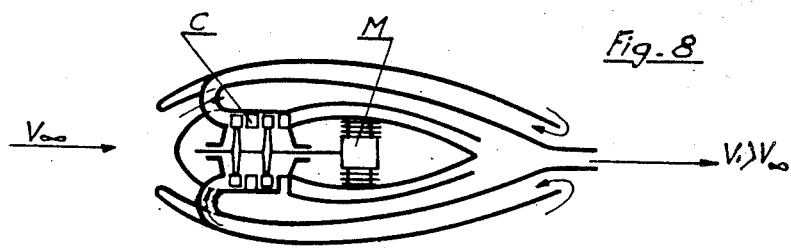

Fig. 8 relates to a modification of the reaction jet propeller shown in Fig. 7a, wherein the air is taken off the front of the aircraft at a pressure which is sufficient for its direct admission to the front of the reaction nozzle.

Figure 9:
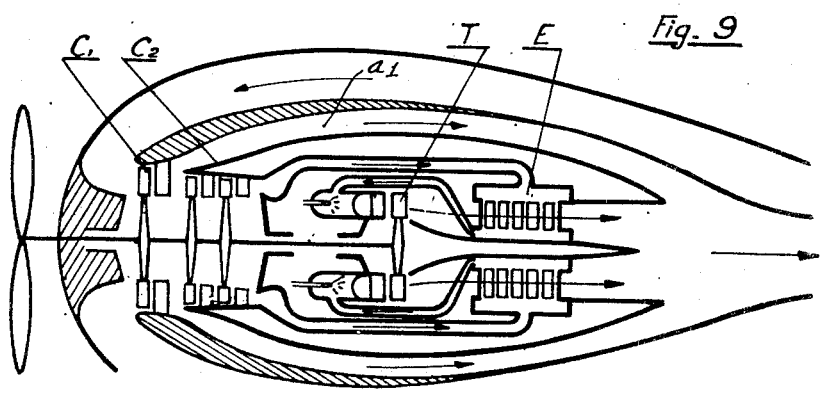

Fig. 9 illustrates a particular arrangement of the reaction propeller with air compressor driven by a gas turbine and a heat recuperator for preheating the air.

Figs. 10, 11, 12, 13 show various manners of arranging the reaction jet propellers and their principal parts on board an airplane.

Figure 14:
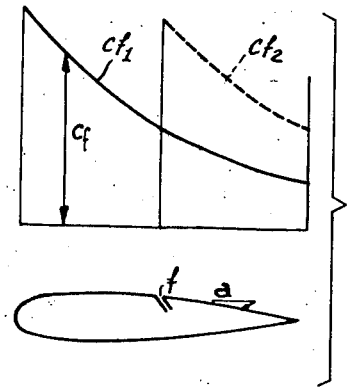
Figure 15:
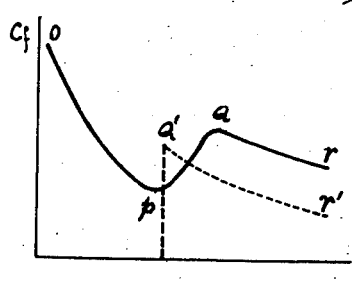

Fig. 14 shows the variation of the local frictional coefficient along the outline of a wing of the aircraft while Fig. 15 shows the modification of the local resistance coefficient through suction of the limiting layer at an intermediary point of the outline.

Figure 1:
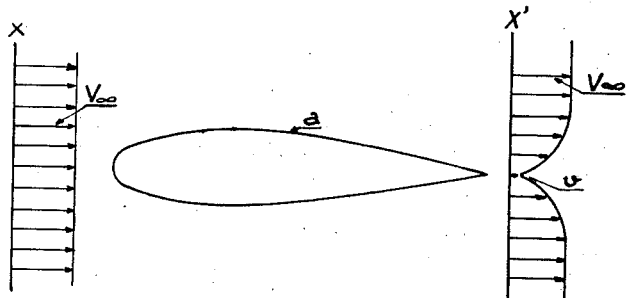
Fig. 1 shows the distribution of the speeds of the air to the front and to the rear of a lifting wing.

The resistance to progress of an aircraft cell is due, as is well known, to the diminution of the momentum or impulse (MV) in the limiting layer. There is shown (Fig. 1) the cross-section of a wing bounded by its outline $a$. The relative speed of the air to the front thereof is uniform and is equal to $V_\infty$; to the rear of the outline the distribution of the speeds is irregular and shows a reduction in the wake of the outline while it retains the value $V_\infty$ at a certain distance from the outline. By applying to each elementary filament of the air current the theorem of the momenta or impulses between two transversal planes X and X' to the front and to the rear of the wing, there is found for the resistance to progress a value $R=\int dm(V_\infty - v)$, $dm$ being the amount of air fed per unit of time for each elementary filament while $v$ is the speed of each filament in the plane X'.

In a reaction jet propeller the resistance R given hereinabove is compensated for by the tractional force F, created by the propeller, which absorbs per unit of time a mass of air M at a speed $V_\infty$ and ejects it rearwardly at a higher speed $V_1$. The application of the same theorem of the momenta or impulses applied under the same conditions as precedingly gives out a value $F=M(V_1-V_\infty)$.

The energy expended per unit time by the propeller is thus $$E=M\frac{(V^2-V_\infty^2)}{2}$$

Figure 2:
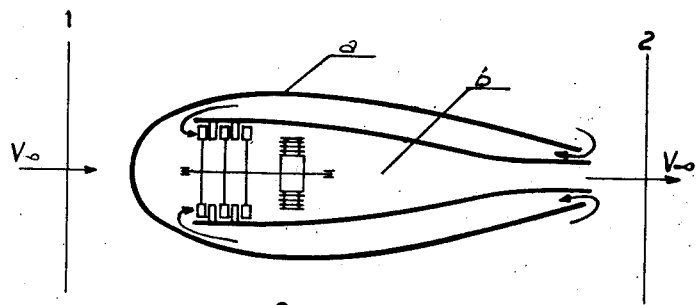
Fig. 2 shows a reaction jet propeller making use of the flow of air taken off the limiting layers and shown for sake of clearness inside a wing or fuselage.

According to the invention, it is possible to reduce the energy thus expended for the propulsion. Considering a reaction propeller $b$ (Fig. 2) arranged for instance inside a wing $a$ and supposing that instead of taking the driving air from the front at a speed $V_\infty$, the air is removed from the limiting layer; applying again the theorem of the momenta between the planes 1 and 2 of Fig. 2 and supposing the speed of the exhaust jet from the propeller is equal to V, it will be found that the resistance of the wing and the propeller is cancelled as the speeds in the plane 2 are homogeneous and equal to $V_\infty$.

It is easy to prove that this arrangement leads to an economy. To make the reasoning simpler, it will be admitted that the flow of the limiting layer, which has a mean speed $v$ smaller than $V_\infty$ is M. The resistance to progress is then $R=M(V_\infty-v)$. Considering on the other hand a reaction jet propeller in which the driving air is taken from the front as usual, but with the same flow M, the speed $V_1$ down-stream with reference to the propeller is given out by the formula:

$$F=M(V_1-V_\infty)=R$$

As $R=M(V_\infty-v)$ the value of the speed $V_1$ is $V_1=2V_\infty-v$.

The energy spent in the propelling device of the aircraft is then:

$$E_0=M\frac{(V_1^2-V_\infty^2)}{2}$$

In the case of the invention being applied, the energy spent in the propelling device is:

$$E_1=\frac{M(V_\infty^2-v^2)}{2}$$

and the preceding formulae show that the difference $E_0-E_1$ has for its value:

(I) $\qquad E_0-E_1=M(V_\infty-v)^2$

This formula I shows that the gain is always positive.

In the case where the invention is not applied the absolute speed of the air in the boundary limit is:

$$(V_\infty-v)$$

and is directed towards the front. It is dispersed after the passage of the aircraft into eddies and the corresponding loss in energy is:

(II) $\qquad \frac{M}{2}(V_\infty-v)^2$

Similarly the air-stream forced backwards by the reaction jet propeller retains the absolute speed $(V_1-V_\infty)$ directed rearwardly and after the aircraft has passed the kinetic energy corresponding thereto is lost under the form of eddies. This loss is equal to $$\frac{M}{2}(V_1-V_\infty)^2$$

or, taking into account the value already calculated for $V_1$, it is also equal to (III) $\qquad \frac{M}{2}(V_1-v_\infty)^2$ In brief the value for the total loss that is to say the sum the losses given by the Formulae II and III is again that given out hereinabove $M(V_\infty-v)^2$ and the gain obtained in accordance with the invention is thus equal to the total loss of the kinetic energy which occurs in an ordinary reaction jet propeller with front air intake. The same reasoning may be begun again in the case of the output $M_1$ of the propeller being different from the flow $M_2$ of the boundary layer and this would show also that the invention leads likewise to a reduction in the power used.

Figure 3:
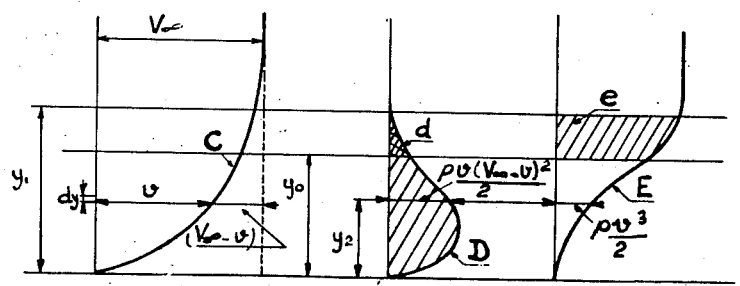
Fig. 3 shows the distribution of the speeds inside the limiting layer together with that of the corresponding energy.

It has been supposed hereinabove by way of simplification that the speed $v$ inside the limiting layer is uniform. As a matter of fact it varies according to a curve such as C (Fig. 3). The thickness of the boundary layer being $y_1$, it is theoretically necessary to suck in the whole of this layer. For a filament of current having a thickness $dy$, the kinetic energy due to the absolute speed is:

$$\rho v dy \frac{(V_\infty-v)^2}{2}$$

$\rho$ being the specific mass of the fluid considered. This kinetic energy is given by the area enclosed by a curve D the coordinates of which are respectively $$\rho v \frac{(V_\infty-v)^2}{2} \text{ and } y$$

The area of this curve D shows the gain in energy afforded by the suction of the limiting layer. As to the kinetic energy measured in terms of relative speed $v$ inside the limiting layer, it is equal to:

$$dE=\rho v dy\frac{v^2}{2}=dy\rho\frac{v^3}{2}$$

and said kinetic energy may be given by the area enclosed by the curve E, the coordinates of which are $$\rho\frac{v^3}{2} \text{ and } y$$

It is apparent that there is no interest in sucking the last filaments of the limiting layer which are the furthest from the wall; as a matter of fact the latter corresponds only to a very small portion $d$ of the area D on one hand. On the other hand, since the velocity of the propelling jet is at least equal to $V_\infty$, the kinetic energy of said filaments at their issuing from the propeller must be $$dE'=\rho v dy\frac{V_\infty^2}{2}$$

This value $dE'$ is little different from $dE$ since the velocity $v$ of said filaments distant from the wall is close to $V_\infty$. As the kinetic energy $dE$ would be first converted into potential energy at the entrance in the casing of the propeller, before the final transformation into the kinetic energy $dE'$, and as it is well known that the transformation of a kinetic energy into a potential one has a poor efficiency, the final gain in energy with such filaments would be only illusory.

If the thickness of the limiting layer sucked in is limited to $y_0$ which allows a reduction in the corresponding flow, the designing of the suction channels is made easier. In order to provide for propulsion, it is then necessary to eject the driving gases at a speed slightly above $V_\infty$, which leads to a slight supplementary loss due to the kinetic energy of the remaining jet which reaches for the unit of mass fed per unit of time $$\frac{(V_1-V_\infty)^2}{2}$$

It is possible moreover to reduce this loss without increasing the thickness of the limiting layer sucked in by increasing the flow passing through the propeller by means of an air intake provided at the front of the apparatus after the manner of an ordinary reaction jet propeller.

If only a fraction of the limiting layer is sucked in by the reaction jet propeller, the complementary power which is in this case necessary for the propulsion of the aircraft may be provided in either of the following manners:

Arrangement of an ordinary airscrew driven together with the propeller compressor, the speed $V_1$ for ejecting the gases being equal to the speed of the aircraft $V_\infty$.

Ejection of the flow of gases from the propeller at a speed $V_1$ higher than $V_\infty$ as obtained through a preliminary more considerable compression of this flow.

In this latter case, the complementary propulsion energy depends on the difference between $V_1$ and $V_\infty$ and when this difference is too considerable the efficiency of propulsion is low.

Figure 4:
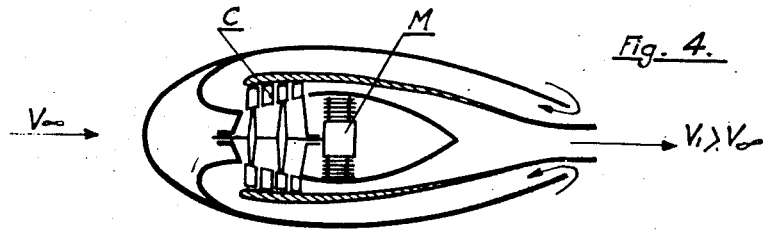
Figs. 4, 5, 6 show various types of reaction jet propellers sucking in a part of the limiting layer, the speed of the exhaust jet being then higher than the speed of progress of the aircraft.
Figure 5:
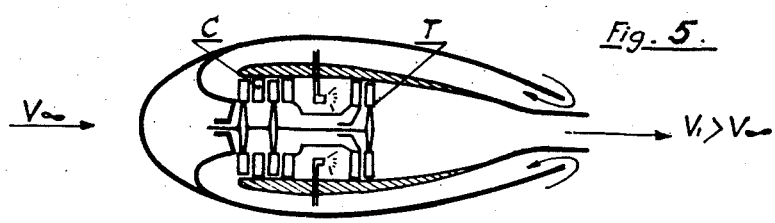
Figure 6:
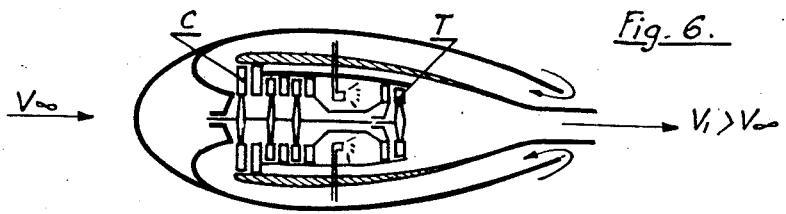

For improving it, it is possible to increase according to a third method the flow of air used for propulsion by providing as an addition to the flow sucked out of the limiting layer, the admission of a complementary amount of air removed from the front of the aircraft and brought to a suitable stage of the compressor by reason of its higher pressure due to the preliminary compression executed in the diffusor which reduces its speed before its entrance into the compressor. Figs. 4, 5, 6 show diagrammatically the application of the second method disclosed with $V_1 > V_\infty$ to a reaction jet propeller not associated with any airscrew and driven by an ordinary motor M or by a gas turbine T or by a gas turbine T provided with a by-pass for a part of the air delivered by the compressor.

Figure 7B:
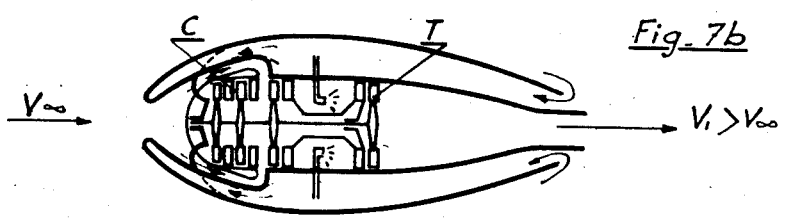
Figure 7C:
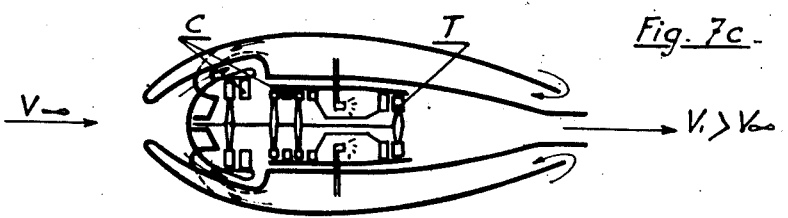

Lastly Figs. 7a, 7b, and 7c illustrate the third method incorporating a complementary air intake to the front of the propeller, said complementary air being brought to a suitable stage of the compressor which is driven by an ordinary motor M (Fig 7a), or by a gas turbine T (Fig. 7b) or by a gas turbine T provided with a by-pass for a part of the air delivered by the compressor and the front air passage (Fig. 7c).

It is also possible in all cases including the use of an airscrew to remove the flow of gases from the propeller at a speed $V_1$ lower than $V_\infty$ but above the speed of the air in the limiting layer at the points from which it is removed. The airscrew would then provide a power slightly above the power strictly required.

Lastly the kinetic energy of the air removed from the front of the reaction jet propeller may be sufficient for it to be no longer necessary to make the corresponding flow pass through the propeller compressor in which case it is sufficient to admix it with the flow of gases formed by the flow from the limiting layer sucked in and the exhaust gases from the motor which drives the said compressor, before expansion in the reaction nozzle. Fig. 8 is a diagram corresponding to this case, the driving motor M being of course of any type.

In the case where the driving motor is a gas turbine, it is well known that from the standpoint of efficiency, it is very advantageous to heat the air before burning by means of the calories contained in the exhaust gases between the turbine and the reaction nozzle by means of a thermic exchanger.

In ordinary reaction jet propellers operating with a flow of air removed from the front of the aircraft and wherein the ejection speed of the gases $V_1$ is much higher than $V_\infty$, it is known fact that the use of such a heat exchanger would meet with considerable difficulties by reason of its weight and also of the fact that the reduction in the potential energy of the gases before the expansion nozzle leads to making the apparatus larger and to use a much more considerable flow for obtaining the same useful effect. In the present case as the speed of ejection is of the order of $V_\infty$, the expansion in the reaction nozzle is much smaller and the arrangement of such a heat exchanger becomes desirable.

By way of example, Fig. 9 shows an exchanger E associated with the propeller. The flow of heated air delivered to the turbine T which drives the air compressor $C_1$, $C_2$ and an auxiliary airscrew, is only a fraction of the flow passing through the compressor $C_1$ sucking in the limiting layer. The compressor $C_1$ sucking in the flow of air from the limiting layer delivers it into a by-pass $a_1$ and into the compressor $C_2$. The air delivered by $C_2$ passes through the thermic exchanger E arranged downstream with reference to the gas turbine T and is heated before it arrives into the combustion chamber arranged before the turbine. The exhaust gases of said turbine and the air from the by-pass $a_1$ are admixed together before the reaction nozzle.

Of course, such an exchanger, heating the air before the turbine by utilizing the heat of the gases issuing from said turbine, may be combined with any of the other embodiments already described.

The gases may be reheated as well known before they expand in the reaction nozzle by a complementary source of heat with a view to executing a permanent or temporary increase of the propelling energy.

Figure 10:
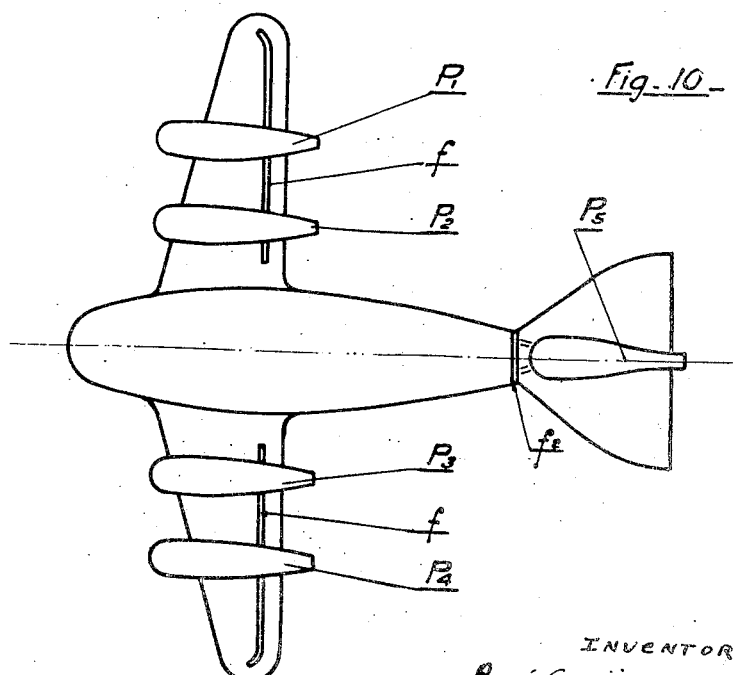

The propellers described hereinabove may be arranged outside the wings and fuselage of an aircraft or else inside the latter according to possibilities of location. Fig. 10 shows by way of example and by no means as a limitation an aircraft provided with reaction jet propellers and with means sucking in the limiting layer while $V_1$ is higher than $V_\infty$ in accordance with one of the combination of means described hereinabove.

Each of the wings is provided on its upper and lower surfaces in the vicinity of its trailing edge with a slot $f$ feeding with air the reaction jet propellers $P_1$, $P_2$, $P_3$, $P_4$.

The fuselage may be also provided towards its rear end with slots $f_2$ feeding a fifth propeller $P_5$. Obviously the number of propellers may be modified as well as their arrangement inside or outside the wing and fuselage of the aircraft. Similarly modifications may be brought to the connections between the suction slots of the limiting layers and the propellers, to the arrangement of the air compressors of said propellers and to the type of the motors, used for driving said compressors. Finally air intakes and/or airscrews may or may not be provided in front of the propellers.

Among the different combinations to be contemplated, that of Fig. 11 should be considered, according to which the flow of limiting layer air is removed through slots 1 provided on the wings, said flow being brought through collecting means 2 to a single reaction jet propeller including an axial compressor 4, a driving motor 5 for driving this compressor 4 and lastly a reaction nozzle 6. The motor 5 is further utilized for driving an airscrew 3.

In order to reduce to the utmost the bulk of the motors or portions of motors inside the wings and to reduce the losses of head on the output of the air sucked in, it is possible to house inside said wings only the part of the propeller which uses the flow of air removed from the limiting layer and to locate inside the fuselage for instance the parts of the driving engine serving for the production of the energy required for driving the compressor.

This energy may be then transmitted through the usual mechanical pneumatic or the like means. In case of pneumatic means it is preferable to preheat the air used therefor.

Fig. 12 illustrates such a form of execution wherein the reaction jet propellers housed inside the wings receive the air fed from the limiting layer through the slots 7 and compressors 8 provide for the compression of this flow of air.

Each compressor 8 is controlled by the gas turbine 9 a driving fluid for which is constituted by the hot gases produced by a second compressor 10 housed inside the fuselage and driven by any motor 11 which may be also constituted by a piston engine as shown or by a gas turbine fed by a part of the output of the compressor 10 after heating inside a combustion chamber. Said compressor 10 delivers into a channel 12 comprising a combustion chamber 13 adapted to raise the temperature of the air delivered. The air thus heated drives the turbine 9 and the exhaust gases from this turbine 9 feed the reaction nozzle 14 after admixture with the air delivered by the compressor 8.

Figure 13:
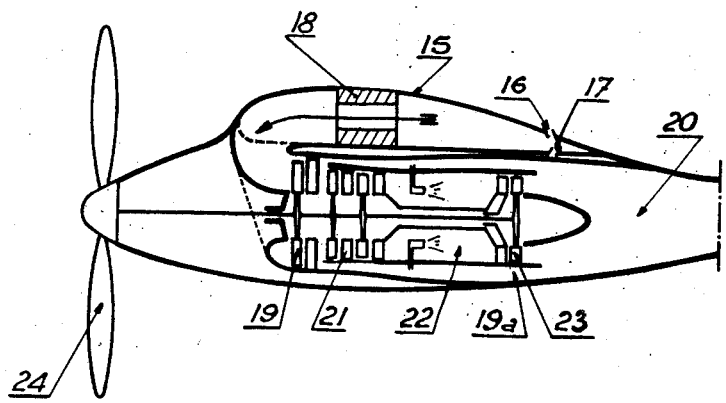

Fig. 13 shows by way of example and by no means in a limitative sense, the arrangement of a reaction jet propeller underneath the aircraft wing 15 while the limiting layer is sucked in through the slots 16, 17 in the vicinity of the trailing edge. The air sucked in through the limiting layer passes through the spar 18 of the wing and enters the compressor 19. At the outlet from the latter, part of the flow of air is removed through the annular duct at point 19a upstream with reference to the reaction nozzle 20 while the remainder is submitted to a complementary compression inside the compressor 21 and feeds the combustion chamber 22 and gas turbine 23. The complementary power provided by the gas turbine 23 drives the air screw 24.

In order to allow an easier adjustment, it may be of interest to no longer associate as disclosed hereinabove the reaction jet propeller fed by the limiting layer with the complementary motor. They may in fact be entirely independent, the reaction jet propeller sucking the boundary layer in being then of the type illustrated in Figs. 4a, 4b, 4c or in Figs. 6a, 6b, 6c or 7a, 7b, 7c, while the complementary power group or groups may be either separate airscrew groups or separate reaction jet propellers of any known type. This arrangement has the advantage residing in that, in climbing for instance, the thickness of the limiting layer does not vary substantially so that the adjustment of the reaction propeller fed by the limiting layer remains unchanged while the complementary power groups are impelled to provide an increased yield of power corresponding to the extra power required for rapid climb.

It has been shown that the suction of the limiting layer should be executed in the vicinity of the trailing edge of the wings and of the fuselage. It is generally known as a matter of fact that in the case of laminary flow the coefficient of local friction becomes smaller with a greater distance from the leading edge. Fig. 14 shows a cross section of the outline $a$ of a wing and a diagram illustrating the variations in the local frictional coefficient $Cf$ along this line. If the limiting layer is sucked in at an intermediary point $f$, the curve $Cf_1$ is replaced by the curve $Cf_2$ from this point which would be detrimental to operation. However if the rate of flow of the limiting layer is turbulent, the frictional coefficient varies according to a different curve $opqr$ shown in Fig. 15, and wherein $p$ corresponds to the point of transition between the laminary and the turbulent flows of air. If a suction is executed at $p$, the curve giving out the local friction coefficient becomes $o$, $p$, $q'$ $r'$ which corresponds to a gain on the frictional value. The suction of the limiting layer may then be executed at this point and simultaneously in the vicinity of the trailing edge to both sides of the same wing or of a fuselage.

It is also generally known that for certain incidences of the lifting wings, the breaking away of the air flow may be avoided by producing a suction of the limiting layer at suitably chosen points. This leads thus to means for increasing permanently or temporarily the lift for instance during landing or during taking off, in association with the reaction jet propulsion as precedingly disclosed.

According to the invention, it is possible to provide for the suction of the limiting layers by means of slots provided near the trailing edge of the wing and fuselage and of slots located at the points of transition between the laminary and the turbulent flows of air and also in an exceptional manner by closing certain of the preceding slots and replacing them wholly or partly by complementary slots corresponding to a desired lifting action.

On the other hand, it has been shown that it was necessary to recover to a maximum the kinetic energy of the limiting layer sucked in or of part of said limiting layer. Now said layer is constituted by filaments assuming different speeds. It is therefore of interest to subdivide the suction means in order to recover to the utmost the energy of the filaments.

By way of example there will be provided in the wing such as that illustrated in transversal cross-section in Fig. 16 slots $a_1$, $a_2$, $a_3$ on the upper surface thereof and slightly in front of the trailing edge together with slots $b_1$, $b_2$, $b_3$ in the lower surface also in the vicinity of the trailing edge, each of these slots feeding at different pressures collecting chambers 25, 26, 27 and 25', 26', 27' arranged inside the thickness of the wing.

In particular and in order to recover to the utmost the kinetic energy of the filaments of the air current forming the limiting layer which is sucked in, the slots should preferably assume a longitudinal outline the shape of which is that of a diffuser or a divergent channel the cross-section of which may be adjustable. The first slot, corresponding to a filament having a substantially zero speed, includes no diffuser and may include a series of holes in the surface of the aircraft.

It is then possible to provide for different means of feeding the compressor or compressors for each jet reaction propeller, taking into account that the different elements of the limiting layer are sucked in at different pressures and with different outputs so that the different suction means may be connected individually with suitable stages of the air compressor or compressors and so may the flow of air taken off the front of the propeller.

The reaction jet propellers adapted to suck in the limiting layer may be adjusted so as to suck in only the filaments comprised within the thickness of the limiting layer (Fig. 17). To obtain such an adjustment it is possible for instance to use an aerodynamic detector 28 giving out the speed at a given distance of the wall of the aircraft. If the limiting layer increases in thickness the difference between the speed given out by the aerodynamic detector and the speed of progress of the aircraft increases and reversely in the opposite case. The flow sucked in may then be adjusted in accordance with the indications of the detector as compared with the indication provided by another aerodynamic detector arranged directly in the relative wind outside the limiting layer.

Obviously the forms of execution described have been given out solely by way of examples and they may be modified chiefly by substituting equivalent technical means for the different parts thereof without widening thereby the scope of the invention as defined in accompanying claims.

What we claim is:

1. In an aircraft provided on its aerodynamic surfaces with apertures located in zones of said surfaces where limiting layers of air at reduced relative velocity are present, and with at least a front air passage, a jet propelling plant delivering the greatest part of the propelling power for said aircraft and including air compressing means comprising a multi-stage air compressor, power means for driving said air compressor, means for heating the air under pressure delivered by the final stage of said air compressor, a reaction nozzle, and means for feeding said reaction nozzle with the air thus heated; air channels freely opened for leading permanently during flight air from said apertures to the first stage of said air compressor; means for connecting said front air passage with an intermediary stage of said air compressor to supply said plant with a supplemental amount of air, and an air by-pass for connecting an intermediary stage of said air compressor directly with said reaction nozzle.

2. In an aircraft powered mainly by reaction jet, including an airfoil surface with a trailing edge, a frontal air intake opening and a reaction nozzle opening out in a zone of said aircraft between the rear end thereof and said trailing edge inclusive, slot-like air inlet passages being provided through both the upper and lower faces of said airfoil surface only in a zone thereof nearer to said trailing edge than to the portion of greatest girth thereof, the combination of an air compressor having at least one compression stage, means for driving said air compressor, piping means between said inlet passages and the intake end of said compression stage for permanently supplying to said compressor the whole amount of air sucked up thereby, said intake end being connected solely with said inlet passages through said piping means so as to be fed with air only from said passages, connecting passage means between the discharge end of said compressor and said nozzle, and connecting means between said intake opening and a zone of said passage means downstream of said compression stage.

3. In an aircraft powered mainly by reaction jet, including an airfoil surface with a trailing edge, a frontal air intake opening and a reaction nozzle opening out in a zone of said aircraft between the rear end thereof and said trailing edge inclusive, slot-like air inlet passages being provided through both the upper and lower faces of said airfoil surface only in a zone thereof nearer to said trailing edge than to the portion of greatest girth thereof, the combination of a multi-stage air compressor, means for driving said air compressor, piping means between said inlet passages and the intake end of a compression stage of said compressor for permanently supplying to said compressor the whole amount of air sucked up thereby, said intake end being connected solely with said inlet passages through said piping means so as to be fed with air only from said passages, connecting means between the discharge end of said compressor and said nozzle, and further connecting means between said intake opening and a further compression stage of said compressor downstream of the first-mentioned compression stage.

RENÉ ANXIONNAZ.
MARCEL HENRI LOUIS SÉDILLE.
ROGER JEAN IMBERT.

REFERENCES CITED

The following references are of record in the file of this patent:

UNITED STATES PATENTS

| Number | Name | Date |
|---|---|---|
| 1,681,562 | Wenstrom | Aug. 21, 1928 |
| 1,803,156 | Wagner | Apr. 28, 1931 |
| 1,854,043 | Korner | Apr. 12, 1932 |
| 1,993,419 | Stalker | Mar. 5, 1935 |
| 2,085,761 | Lysholm | July 6, 1937 |
| 2,376,862 | Bowen | May 29, 1945 |
| 2,409,446 | Pavlecka | Oct. 15, 1946 |

FOREIGN PATENTS

| Number | Country | Date |
|---|---|---|
| 390,363 | Great Britain | Apr. 6, 1933 |
| 456,980 | Great Britain | Nov. 16, 1936 |
| 512,064 | Great Britain | Aug. 29, 1939 |
| 568,667 | Great Britain | Apr. 16, 1945 |
| 556,866 | Great Britain | Oct. 26, 1943 |
| 870,648 | France | Dec. 22, 1941 |
| 877,590 | France | Sept. 7, 1942 |
| 886,889 | France | July 19, 1943 |

OTHER REFERENCES

Ser. No. 367,666, Anxionnaz et al. (A. P. C.), published May 25, 1943.